United States Patent [19]

Allcock et al.

[11] 4,276,403
[45] Jun. 30, 1981

[54] PROCESS FOR THE PREPARATION OF POLYCARBORANYLPHOSPHAZENES

[76] Inventors: Robert A. Frosch, Administrator of the National Aeronautics and Space Administration, with respect to an invention of Harry R. Allcock, State College, Pa.; John P. O'Brien, Wilmington, Del.; Angelo G. Scopelianos, University Park, Pa.; Larry L. Fewell, San Jose, Calif.

[21] Appl. No.: 129,798

[22] Filed: Mar. 12, 1980

[51] Int. Cl.³ ............................................. C08G 73/00
[52] U.S. Cl. ....................................... 528/4; 528/168; 528/399; 528/6
[58] Field of Search .................................... 528/4, 399

[56] References Cited

U.S. PATENT DOCUMENTS

| | | | |
|---|---|---|---|
| 3,155,630 | 11/1964 | Schroeder | 528/6 |
| 3,164,556 | 1/1965 | Apley et al. | 528/399 |
| 3,169,933 | 2/1965 | Liu et al. | 528/399 |
| 3,549,604 | 12/1970 | Semenuk et al. | 528/4 |

Primary Examiner—Wilbert J. Briggs, Sr.
Attorney, Agent, or Firm—Darrell G. Brekke; John R. Manning

[57] ABSTRACT

Polydihalophosphazenes, e.g. $\{N=P(Cl)_2\}_n$, are allowed to react at ambient temperatures for at least one hour with a lithium carborane in a suitable inert solvent. The remaining chlorine substituents of the carboranyl polyphosphazene are then replaced with aryloxy or alkoxy groups to enhance moisture resistance. The polymers give a high char yield when exposed to extreme heat and flame and can be used as insulation.

3 Claims, No Drawings

PROCESS FOR THE PREPARATION OF POLYCARBORANYLPHOSPHAZENES

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

TECHNICAL FIELD

This invention relates to carboranyl-substituted polyphosphazenes and more particularly to a process for making such polymers.

BACKGROUND ART

Polyphosphazenes, a type of "inorganic rubbers" having the general formula $+N=P(X)_2+_n$, are generally prepared by heating at 200° to 300° C. cyclic oligomers of the above formula in which n is equal to 3 or 4. The resulting polymers, in which X stands for a halogen atom, are then rendered stable in the presence of water by reaction with sodium, potassium, magnesium, calcium, or lithium alcoholates or phenolates, thus substituting alkoxy and/or aryloxy groups for the halogen atoms of the polymers (e.g., U.S. Pat. Nos. 3,370,020; 3,880,800 and 3,883,451). Interestingly, when the substitution of the halogen atoms with —OR groups is done at the oligomer stage, the compounds obtained can no longer be polymerized.

Various lower alkyl groups and alicyclic groups have also been substituted for some of the chlorine atoms of dichlorophosphazene oligomers, for instance by irradiating tetrameric $Cl_2PN$ in decahydronaphthalene to obtain $(C_{10}H_{17})Cl_7P_4N_4$. As far as is known, however, none of the low melting materials so obtained have been polymerized. A list of compounds of this type can be found in Cotton (Ed.), "Progress in Inorganic Chemistry," volume IV, page 321 (1962).

As to carborane-substituted polyphosphazenes, none have been reported so far. In fact, the only known carborane-substituted inorganic polymers have been obtained by a Grignard type reaction involving a bromoalkylcarborane and an alkenyl bromide to form an alkenylcarborane which is then allowed to react with a silane to yield a carboranyl-substituted silane monomer. This compound is then polymerized to a carboranyl-polysiloxane (U.S. Pat. No. 3,431,234).

The state of the art remains such, however, that no instance of direct attachment of a carboranyl group to a phosphorus atom has been reported, either in a small molecule or in a polymeric specimen.

The principal object of this invention is to provide a method by which carboranyl substituents can be placed on a polyphosphazene molecule.

DISCLOSURE OF INVENTION

The objects of this invention have been accomplished by allowing a lithium carborane in a suitable solvent to react with a linear high molecular weight poly(dihalophosphazene) at about 25° C. for a period of at least one hour. The halogen atoms then remaining on the carboranyl-substituted polyphosphazene can then be replaced by alkoxy or aryloxy groups by reaction of the polymer with, for instance, sodium trifluoroethoxide. The original poly(dihalophosphazene) is prepared in the conventional manner by heating the corresponding cyclic oligomeric dihalophosphazene at 250° C. until the desired degree of polymerization has been achieved.

DETAILED DESCRIPTION OF THE INVENTION

The chemical reactions and the compounds involved in the practice of the present invention can be more easily visualized by referring to the following scheme:

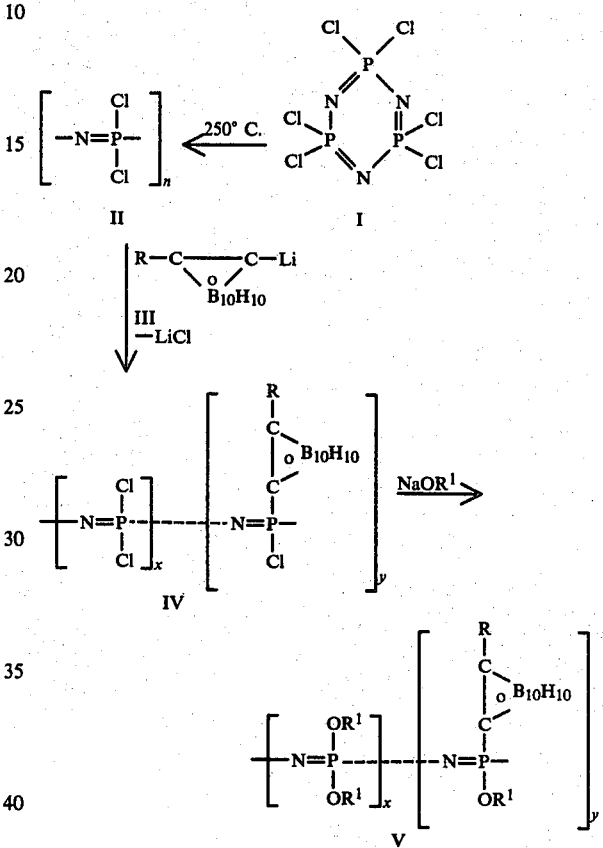

In the above formulas, R represents a hydrogen atom, a lower alkyl radical having up to about 6 carbon atoms or an aryl radical of up to about 9 carbon atoms, the methyl and phenyl groups being preferred; $R^1$ represents an alkyl radical containing up to about 6 carbon atoms, a fluorinated alkyl radical containing up to about 6 carbon atoms, an aryl radical containing up to about 9 carbon atoms, a chlorinated aryl radical containing up to about 9 carbon atoms, and mixtures thereof, n is an integer such that the molecular weight of the polyhalophosphazene (II) is within the range of about $1 \times 10^4$ to $1 \times 10^6$, as determined by gel permeation chromatography; x+y=n; and x:y is within the range of 9.5:0.5 to 6.0:4.0.

The lithium carborane (III) employed in the above scheme is prepared from the alkyl or arylcarborane by reaction with n-butyllithium in the conventional manner. One of the alkylcarboranes, methylcarborane, was prepared from the bromomethyl homolog by reaction with magnesium metal and subsequent hydrolysis of the metal organic bromide obtained. The reaction between the carborane and the organolithium is carried out at ambient temperature in a solvent such as diethyl ether. The resulting solution is combined with a high molecular weight polymeric dihalophosphazene (II) and allowed to react at ambient temperature for at least 0.5 hour to yield a randomly carboranyl-substituted polyhalophosphazene (IV). The original dihalophosphazene (II) is prepared from a cyclic oligomeric dihalophosphazene, such as the trimer or the tetramer of difluoro or dichlorophosphazene, by heating the selected compound at 200° to 300° C. in the conventional manner.

The remaining halogen substituents on the carboranylpolyhalophosphazene (IV) may then be replaced by dissolving said polymer in a suitable solvent such as benzene, toluene, xylene, tetrahydrofuran, and mixtures thereof, and adding one or more soluble alcoholate or phenolate with adequate stirring. Both the method and the materials that can be employed in this esterification reaction are described in several patents, including the three pertinent U.S. patents listed in the background art of the present specification.

The carboranyl-substituted polyphosphazenes prepared by the process of this invention have a rubber-like consistency and possess a range of useful properties such as heat and chemical resistance, which vary according to the extent of carboranylation and esterification achieved. For instance, polymers with a 1:5 ratio of carborane groups to $-OCH_2CF_3$ groups have given a char yield of more than 50% by weight at 1000° C., as determined by means of a du Pont model 990 thermogravimetric analyzer. Materials of this caliber are very useful for protection against heat and flames.

The process of the invention will now be illustrated in operational detail by the following examples which are not intended to limit the scope of said invention as stated in the appended claims.

EXAMPLE 1

A solution of polydichlorophosphazene (II), 3.76 g ($3.16 \times 10^{-2}$ mol), in dry tetrahydrofuran, 100 ml, was added slowly to a solution of methyl lithiocarborane, 5.18 g ($3.16 \times 10^{-2}$ mol), in tetrahydrofuran, 50 ml, at 25° C. After one hour, the solution was treated with an excess of sodium trifluoroethoxide, 11.56 g, in boiling tetrahydrofuran for a period of 0.5 hour. The resulting polymer was isolated by precipitation from the reaction medium and purified by fractional reprecipitation from tetrahydrofuran into hexane and benzene. Microanalysis and $^{31}P$ integration indicated an x:y ratio of 5.95 for the polymer (VIII) and its molecular weight, as determined by gel permeation chromatography, was $1 \times 10^6$.

EXAMPLE 2

The procedures of Example 1 were repeated with phenyl lithiocarborane, using the same materials and proportions. This yielded a carboranyl-substituted trifluoroethoxyphosphazene polymer (IV) with a gel permeation molecular weight of $3 \times 10^5$ and an x:y ratio of 10:90.

The polymers obtained with the process of the invention are water and chemical resistant elastomers with a thermal stability proportionally enhanced as the carborane substituent concentration is increased.

We claim:

1. A process for the preparation of carboranyl-substituted polyphosphazenes, which comprises allowing a solution of a lithiocarborane having the formula

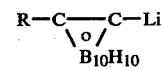

to react at about ambient temperature with a solution of a polyphosphazene of the formula $+N=PX_2+_n$ for a period of at least 25 minutes, said reactants being present in an original concentration ranging from about equimolar to a 50% excess of either reactant, and said formulas being further defined by R being a substituent selected from the class consisting of hydrogen, alkyl radicals of up to about 6 carbon atoms, and aryl radicals of up to about 9 carbon atoms; X being fluorine, chlorine or bromine; and n being an integer such that the molecular weight of the polyphosphazene is within the range of about $10^4$ to $1 \times 10^6$.

2. The process of claim 1 wherein R is a methyl group and X is chlorine.

3. The process of claim 2 wherein R is a phenyl group.

* * * * *